(12) United States Patent
Yue (10) Patent No.: US 9,967,415 B2
(45) Date of Patent: May 8, 2018

(54) FLEXIBLE SCANNER COVER (71) Applicant: KYOCERA Document Solutions Inc., Osaka (JP)

(72) Inventor: Tommy Yue, Concord, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days. days.

(21) Appl. No.: 15/282,902

(22) Filed: Sep. 30, 2016

(65) Prior Publication Data
US 2018/0097952 A1 Apr. 5, 2018

(51) Int. Cl.
H04N 1/00 (2006.01)
H04N 1/10 (2006.01)

(52) U.S. Cl.
CPC ..... *H04N 1/00551* (2013.01); *H04N 1/00018* (2013.01); *H04N 1/00034* (2013.01); *H04N 1/00058* (2013.01); *H04N 1/00082* (2013.01); *H04N 1/00557* (2013.01); *H04N 1/00559* (2013.01); *H04N 1/00827* (2013.01); *H04N 1/10* (2013.01); *H04N 2201/0094* (2013.01)

(58) Field of Classification Search
CPC ........... H04N 1/00551; H04N 1/00018; H04N 1/00827; H04N 1/00519; H04N 2201/0422
USPC ........ 358/3.32, 505; 399/110, 125, 379, 380
See application file for complete search history.

(56) References Cited

U.S. PATENT DOCUMENTS

| 4,721,981 A * | 1/1988 | Rauen | G03G 15/602 271/244 |
| 5,835,195 A * | 11/1998 | Gibson | G03F 7/70275 355/53 |
| 6,122,481 A | 9/2000 | Rusnack | |
| 2003/0067634 A1 * | 4/2003 | Payne | H04N 1/00551 358/474 |

* cited by examiner

*Primary Examiner* — Jamares Q Washington
(74) *Attorney, Agent, or Firm* — West & Associates, A PC; Stuart J. West (57) ABSTRACT An image reproduction device having a movable frame with a central aperture and an extendable soft cover. The soft cover can be extended from a storage position to at least partially span a platen and cover three dimensional objects resting on the platen. The frame can be lowered to seal the soft cover over and around the object and platen, such that it blocks light transmission into and out of the image reproduction device during scanning.

20 Claims, 9 Drawing Sheets

FLEXIBLE SCANNER COVER

BACKGROUND

Field of the Invention

The present disclosure relates to scanners, particularly a scanner with a flexible platen cover.

Background

Image reproduction devices, such as scanners and copiers, generally have a glass platen upon which an object can be placed so that image sensors can scan the object through the platen. Image reproduction devices generally also have a hard cover that can be lowered over the object and platen, to block outside light from interfering with the scanning operation and/or to reflect light emitted by image sensors or internal light sources during the scanning process.

Blocking outside light and preventing the escape of desired interior light can improve the quality of scanned images. When the platen is not covered adequately, lost light and/or unwanted outside light can cause the scanned image to have dark backgrounds instead of light backgrounds, and or cause other image deterioration, such as blurring or poor resolution scans.

Traditional hard covers can work well for covering a platen over thin planar objects, such as sheets of paper. However, when the object to be scanned is an object with more depth, such as an opened book or any three dimensional object with more than a minimal depth, the object can prevent the hard cover from fully closing. As such, the hard cover cannot prevent the loss of interior light and exterior light can enter the image sensors under the platen. This can cause poor scan quality.

What is needed is a cover that can fully enclose a three dimensional object above a platen, when the three dimensional object has a depth that would prevent conventional hard covers from fully closing.

SUMMARY

The present disclosure provides an image reproduction device having a platen, image sensors, a moveable frame defining a central aperture, and a soft cover. The moveable frame can be selectively movable between a lowered position in which the frame is parallel to and surrounds the platen, and a raised position in which the frame is above the platen. The soft cover can be selectively extendable from a storage position to at least partially span across the platen. When the soft cover is extended at least partially across the platen to cover an object resting on the platen and the frame is moved to its lowered position over the soft cover, the frame can at least partially seal the soft cover around the object and the soft cover can block light transmission during scanning of the object with the image sensors.

The present disclosure also provides an image reproduction device having a platen, image sensors, a moveable frame defining a central aperture, and a soft cover. The moveable frame can be selectively movable between a lowered position in which the frame is parallel to and surrounds the platen, and a raised position in which the frame is above the platen. The soft cover can have a leading edge coupled to a movement system on the frame, and be selectively extendable from a storage position by the movement system to an extended position in which the soft cover at least partially spans the frame's central aperture. When the soft cover is extended by the movement system to at least partially span the frame's central aperture and the frame and soft cover are moved to the frame's lowered position, the frame can seal the soft cover an object resting on the platen and the soft cover can block light transmission during scanning of the object with the image sensors.

The present disclosure also provides a method of scanning, the method comprising raising a frame with motorized arms to a position above a platen upon receipt of an instruction to begin a scanning operation, the frame defining a frame aperture, extending a soft cover from a storage position across the length of the frame to at least partially span the frame aperture using a motorized movement system, lowering the frame and soft cover with the motorized arms towards a position parallel to and against the platen, and performing a scanning operation with scanner components below the platen. Light emitted by scanner components can be blocked from escaping by the soft cover and exterior light can be blocked from reaching the scanner components by the soft cover.

DETAILED DESCRIPTION

Figure 1:
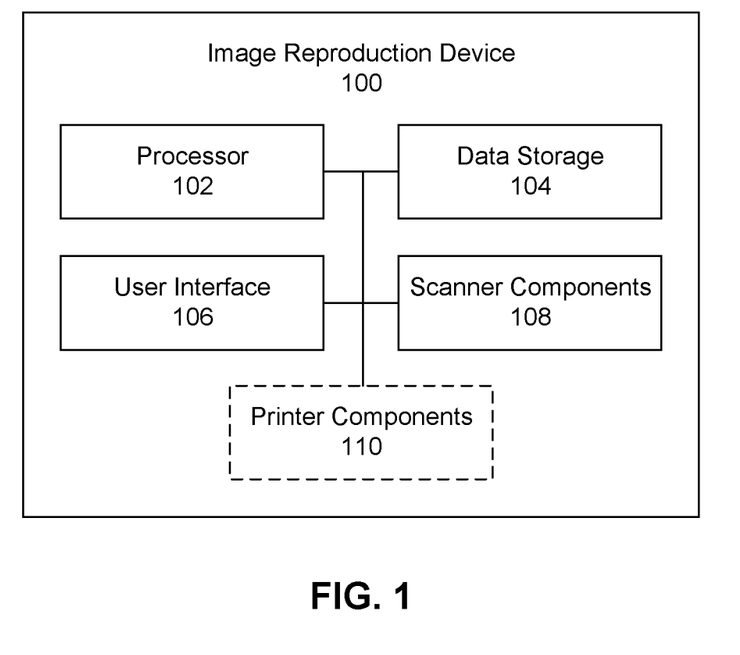
FIG. 1 depicts a block diagram of components of an image reproduction device.

FIG. 1 depicts a block diagram of components of an image reproduction device 100. The image reproduction device 100 can be a scanner or copier that is configured to capture an image of a document or other object and then print a copy of the image and/or store the image in digital memory. In some embodiments, the image reproduction device 100 can be part of a multifunctional printer (MFP), such as an "all-in-one" machine that has a plurality of different functions such as printing, copying, scanning, and/or other functions. In other embodiments, the image reproduction device 100 can be a standalone scanner or copier. An image reproduction device 100 can comprise at least one processor 102, data storage 104, a user interface 106, and one or more scanner components 108.

A processor 102 can be a chip, circuit, or controller configured to execute instructions to direct the operations of the image reproduction device 100, such as a central processing unit (CPU), application-specific integrated circuit (ASIC), field-programmable gate array (FPGA), graphics processing unit (GPU), or any other chip, circuit, or controller. In some embodiments a plurality of chips, circuits, and/or controllers can operate together to direct the operations of the image reproduction device 100.

Data storage 104 can be one or more internal and/or external digital storage devices, such as random access memory (RAM), read-only memory (ROM), electrically erasable programmable read-only memory (EEPROM), flash memory, digital tape, a hard disk drive HDD), a solid state drive (SSD), any/or any other type of volatile or non-volatile digital memory. The data storage 104 can store instructions executable by the processor 102 to operate the image reproduction device 100, including an operating system and/or applications.

The user interface 106 can comprise hardware and/or software elements for receiving instructions from users and/or displaying information to users. In some embodiments the user interface 106 can comprise graphical user interfaces and/or other interfaces operable by users through input/output devices 220, as will be discussed below.

The scanner components 108 can comprise one or more image sensors, such as contact image sensors (CIS), charge coupled devices (CCD), or image sensors of any other type. The image sensors can be configured to scan documents or other items that are placed on a platen 204, as will be discussed below. The scanner components 108 can also comprise one or more interior light sources that emit light toward objects resting on the platen 204, such that light reflected by the objects can be received by the image sensors during scanning.

In embodiments in which the image reproduction device 100 is a copier or MFP, such that it is configured to print images on paper, the image reproduction device 100 can further comprise printer components 110. Printer components 110 can apply ink and/or toner to paper to print text and/or images onto the paper. In some embodiments the printer components 110 can be laser printer components, such as laser diodes, lenses, mirrors, photoconductor drums, toner hoppers, charge rolls, fusers, and/or other components. In other embodiments the printer components 110 can be inkjet printer components, such as print heads and ink cartridges. In still other embodiments, the printer components 110 can comprise components of any other desired type of color or monochrome printer. In some of these embodiments the image reproduction device 100 can further comprise one or more paper storage areas from which it can draw pieces of paper to be printed on by the printer components 110, such as paper drawers or trays, and/or other processing components such as a finisher.

The image reproduction device 100 can be configured to store digital representations of scanned objects generated by the scanner components 108 in memory, such as in its data storage 104. Digital representations of scanned objects can be printed with printer components 110, stored for later retrieval, or transferred to other devices over a wired or wireless data connection. In some embodiments the printer components 110 and scanner components 108 can work together in a copy function to scan documents using the scanner components 108 and then print them using the printer components 110.

In some embodiments the image reproduction device 100 can further comprise fax components for faxing scanned documents, network components for transmitting data over the internet or any other data network, and/or ports for connecting to other devices, such as USB and Ethernet ports.

FIGS. 2A-2D depict external views of an embodiment of an image reproduction device 100. The image reproduction device 100 can comprise a housing 202, a platen 204, a frame 206, and a soft cover 208.

The housing 202 can be a case or outer body that surrounds the interior of the image reproduction device 100. The housing 202 can define an aperture on an upper planer surface of the housing 202.

The platen 204 can be transparent planer member, such as a plane of glass, plastic, or other transparent material. The platen 204 can be positioned to span and fill the aperture, such that the platen 204 is suspended above the interior of the image reproduction device 100. In some embodiments, the platen 204 and/or aperture in the housing 202 can be rectangular, as shown in FIG. 2A.

The frame 206 can be a substantially planar member that defines and surrounds a frame aperture. The dimensions of the frame aperture within the frame 206 can be substantially the same size and shape as the platen 204. The frame 206 can be selectively moved between a lowered position as shown in FIG. 2A and a raised position as shown in FIG. 2B. In some embodiments the frame 206 can be locked into its raised position until it is desired that the frame 206 return to its lowered position.

Figure 2A:
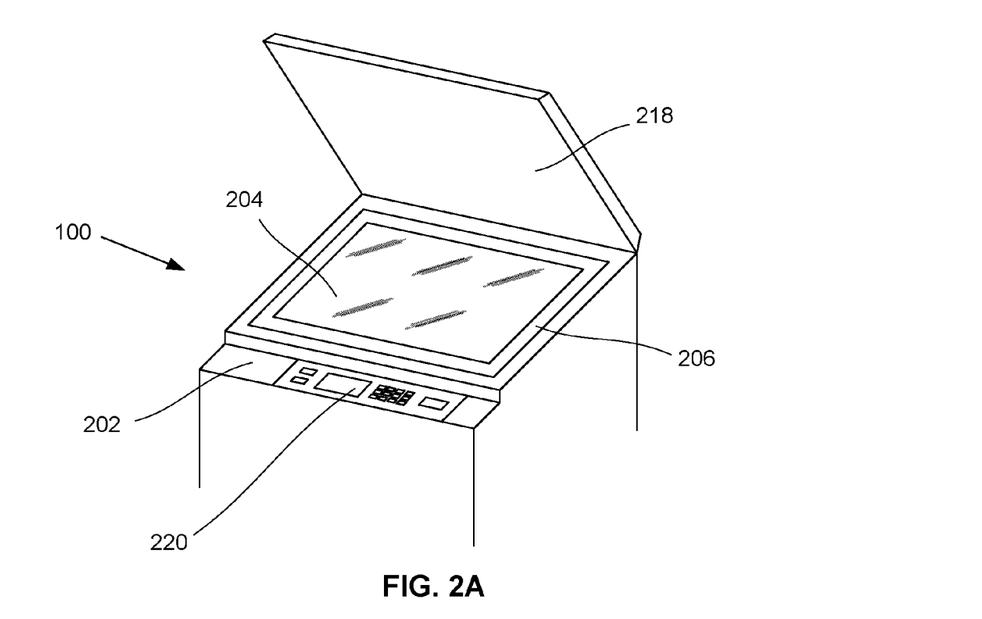
FIGS. 2A-2D depict external views of an embodiment of an image reproduction device comprising a frame and a soft cover.
Figure 2B:
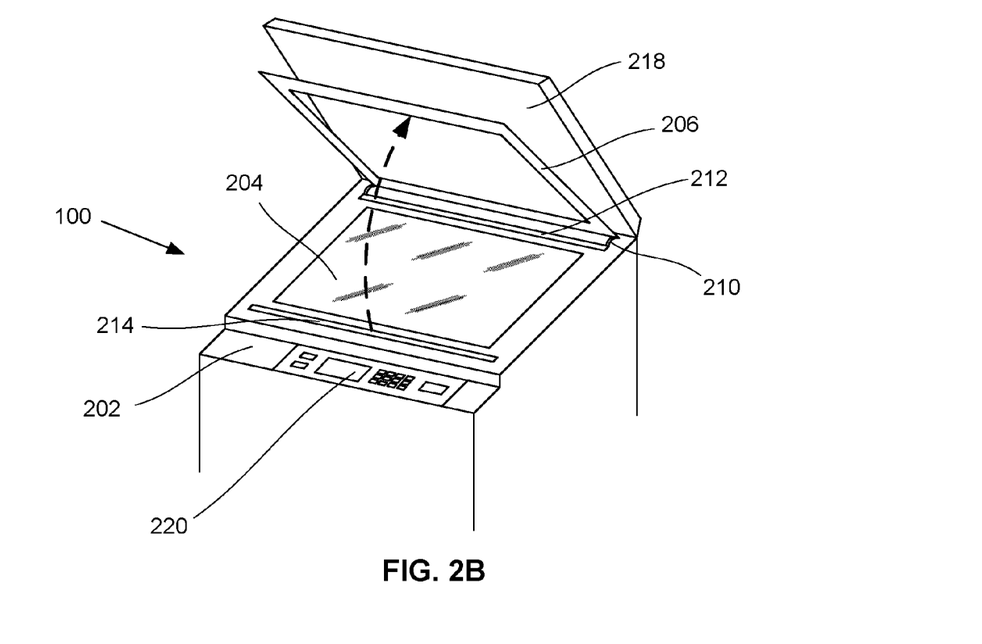

In its lowered position, the frame 206 can substantially surround the platen 204 as shown in FIG. 2A. In some embodiments the frame 206 can be flush with the housing 202 around the platen 204 when the frame 206 is in its lowered position, while in other embodiments the frame 206 can rest above the plane of the upper housing 202 and/or platen 204 when the frame 206 is in its lowered position.

As shown in FIG. 2B, the frame 206 can be flipped up or otherwise elevated from its lowered position to its raised position, such that some or all of the frame 206 is above the plane of the platen 204. In some embodiments the frame 206 can be mounted on arms 210 that can selectively extend from the housing 202, such that edges of the frame 206 can be raised above the upper plane of the housing 202 and/or platen 204 when the arms 210 are extended. In some embodiments such arms 210 can be curved, so that the arms can be extended from the housing 202 along a curve to raise and rotate the frame 206 as shown in FIG. 2B. In alternate embodiments the frame 206 can be hingeably coupled with the housing 202, be mounted on arms 210 or other extensions that can raise the frame 206 while it remains parallel to the plane of the platen 204, or be coupled with the housing 202 in any other desired manner.

In some embodiments the frame 206 can be manually raised and lowered. In alternate embodiments movement of the frame 206 and/or arms 210 can be mechanized with servos, motors, gears, or other mechanical components, such that the frame 206 can be raised or lowered automatically upon receipt of an instruction from a user or according to a command from an operating system or application running at the image reproduction device 100.

The soft cover 208 can be a piece of material that can be selectively positioned to cover some or all of the platen 204. In some embodiments the soft cover 208 can selectively extend from, and retract into, a soft cover slot 212 in the housing 202. By way of a non-limiting example the soft cover 208 can be pulled from and/or extended from the soft cover slot 212 such that it can span the platen 204, while it can be fed into or retracted into the soft cover slot 212 when the soft cover 208 is not in use.

In some embodiments the soft cover 208 can have dimensions that are longer and/or wider than the platen 204, such that it can be positioned to cover some or all of the platen 204. By way of a non-limiting example, the soft cover 208 can be extended from the soft cover slot 212 to cover the entirety of the platen 204 and extend at least partially under the frame 206 when the frame 206 is in its lowered position.

In alternate embodiments the soft cover 208 can have dimensions smaller than the length and/or width of the platen 204 such that the soft cover 208 can be positioned to cover a less than full portion of the platen 204. By way of a first non-limiting example, in some embodiments the soft cover 208 can cover a back portion of the platen 204, such as a back half or back third of the platen 204. By way of a second non-limiting example, in other embodiments the soft cover 208 can cover a left, central, or right portion of the platen 204, such as a left half or right half of the platen 204.

In some embodiments in which the soft cover 208 is sized or selectively positioned to cover a less than the full platen 204, one or more edges of the soft cover 208 can be reinforced with a substantially rigid planar member. One or both ends of the substantially rigid planar member can be pinned under the frame 206 when the frame 206 is lowered over the soft cover 208, such that the substantially rigid planar member holds an exposed edge of the soft cover 208 against the platen 204. By way of non-limiting examples, when the soft cover 208 is sized to cover a back portion of the platen 204, or when the soft cover 208 is larger than the full platen 204 but is selectively extended to cover only a back portion of the platen 204, the leading edge of the soft cover 208 can have a substantially rigid planar member that can be held against the platen 204 by the frame 204.

The soft cover 208 can comprise flexible and/or stretchable materials, such as spandex fibers or other synthetic fibers, silicone, plastic, canvas, rubber, and/or any other flexible and/or stretchable materials. By way of a non-limiting example, in some embodiments the soft cover 208 can comprise resilient spandex fibers such that can allow the soft cover 208 to be stretched to a length that is multiple times greater than its original length, while returning to its original length when the soft cover 208 is relaxed.

The soft cover 208 can also comprise material that is substantially opaque to light transmission in some or all wavelengths, such as wavelengths of visible light emitted and/or detected by scanner components 108. By way of a non-limiting example the soft cover 208 can block transmission of light from exterior light sources from passing into and through the platen 204 when the soft cover 208 covers the platen 204, and/or block the escape of light emitted by interior sources such as the scanner components 108. In some embodiments the face of the soft cover 208 that is directed toward the platen 204 can be at least partially reflective, such that it can reflect light that is emitted upward from light sources inside the housing 202, such as light sources in the scanner components 108. As such, during scanning light emitted by scanner components 108 can be reflected downward by the soft cover 208 back toward the scanner components 108.

In some embodiments the soft cover 208 can comprise a plurality of materials such that it is both stretchable and opaque to light transmission in desired wavelengths. By way of a non-limiting example, the soft cover 208 can comprise stretchable spandex fibers interwoven with yarn or other natural or synthetic fibers that are opaque to the transmission of visible light wavelengths emitted and detected by scanner components 108. In some embodiments the soft cover 208 can be woven according to methods described in U.S. Patent Application Publication 2009/0191777, herein incorporated by reference. In other embodiments, the soft cover 208 can be produced by any other desired method.

Figure 3:
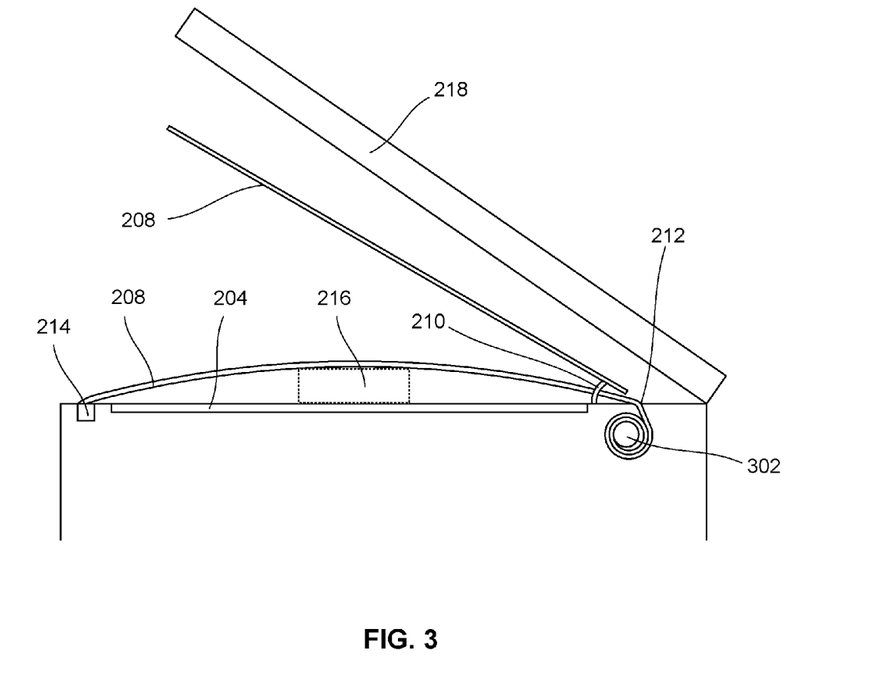
FIG. 3 depicts a side cross-sectional view of an embodiment of an image reproduction device comprising a frame and a soft cover.

FIG. 3 depicts a side cross-sectional view of an embodiment of the image reproduction device 100. In some embodiments the image reproduction device 100 can comprise a soft cover storage roll 302 inside the housing 202, such that the soft cover 208 can be selectively rolled around the soft cover storage roll 302 for storage or extended from the soft cover storage roll 302 through the soft cover slot 212. In some embodiments the soft cover storage roll 302 can be spring loaded or otherwise tensioned such that it tends to pull the soft cover 208 around the soft cover storage roll 302. As such, in these embodiments the soft cover 208 can automatically retract when its leading edge is not held in place at soft cover anchors 214 or manually held to keep the soft cover 208 extended. In alternate embodiments movement of the soft cover storage roll 302 can be mechanized with servos, motors, gears, and/or other mechanical components, such that such that the soft cover 208 can be extended or retracted automatically upon receipt of an instruction from a user or according to a command from an operating system or application running at the image reproduction device 100.

Returning to FIGS. 2A-2D, in some embodiments the housing can comprise at least one soft cover anchor 214. The soft cover anchor 214 can be positioned on an opposing side of the platen 204 from the soft cover slot 212. A soft cover anchor 214 can be a connector or attachment point to which a leading edge of the soft cover 208 can connect when it is extended across the platen 204. In some embodiments a soft cover anchor 214 can be a slot with an edge that the soft cover's leading edge can be hooked or latched onto.

In some embodiments the leading edge of the soft cover 208 can have connectors that are configured to be selectively coupled with a soft cover anchor 214. By way of non-limiting examples, a soft cover anchor 214 can be a groove and the leading edge of the soft cover 208 can have hooks that can latch into the groove or an elongated component running along the leading edge that can be press-fit into the groove to hold the leading edge of the soft cover 208 at the soft cover anchor 214.

In some embodiments, the soft cover slot 212 and/or soft cover anchor 214 can be covered by the frame 206 when the frame 206 is in its lowered position around the platen 204, but be exposed when the frame 206 is raised. In other embodiments the soft cover slot 212 and/or soft cover anchor 214 can be exposed when the frame 206 is lowered in place around the platen 204.

Figure 2C:
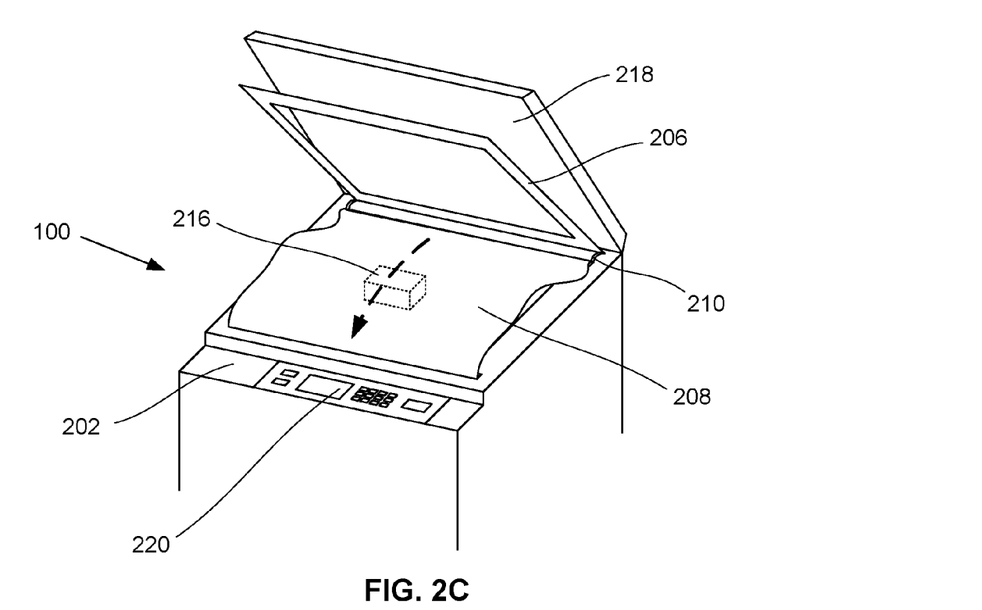
Figure 2D:
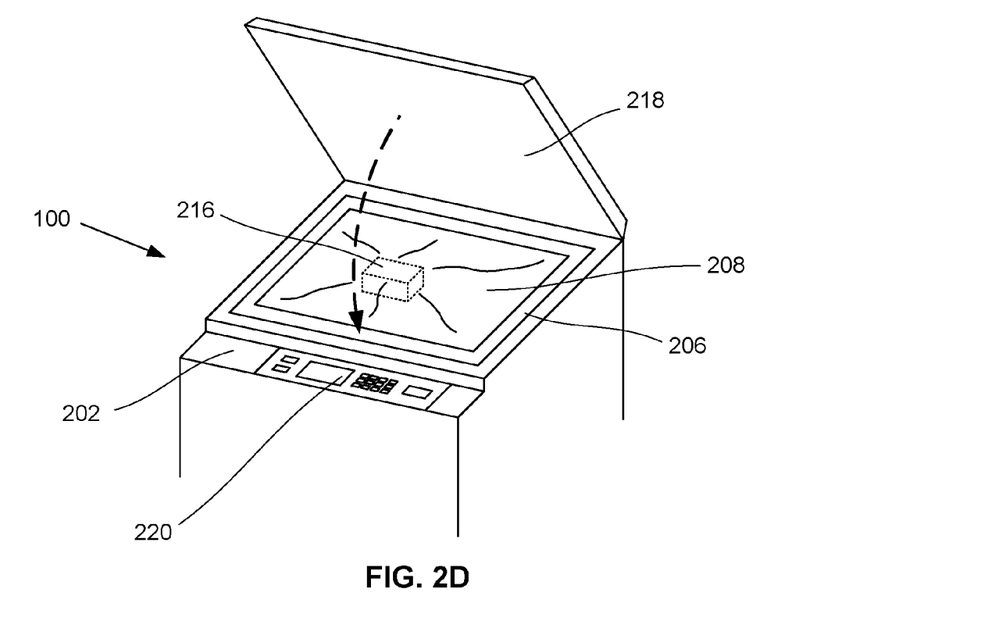

As shown in FIG. 2C and FIG. 2D, when an object 216 is placed on the platen 204 the soft cover 208 can be extended over the object 216. The flexible and/or stretchable nature of the soft cover 208 can allow it to deform around the object 216. In some embodiments the leading edge of the soft cover 208 can be held in place by one or more soft cover anchors 214. In some embodiments, the soft cover 208 can be partially retracted into the soft cover slot 212 to tighten the soft cover 208 around the object and reduce slack. The frame 206 can be lowered onto the top of the soft cover 208, such that it holds down the soft cover 208 around the edges of the platen 204. As such, even when the object 216 is not planar and/or has a depth larger than a piece of paper, the platen 204 can be covered by the soft cover 208 and sealed by the frame 206 such that exterior light is blocked from reaching the platen 204 from the edges of the soft cover 208 and interior light is blocked from escaping during scanning with the scanner components 108. As the soft cover 208 can stretch and deform around the object 216, the soft cover 208 can provide a smooth and/or gradually changing background during scanning, which can improve scan quality in some situations.

In alternate embodiments the soft cover 208 can cover an object 216 but not cover the full dimensions of the platen 204. By way of a non-limiting example, the soft cover 208 can be extended to cover an object 216 positioned within a rear portion of the platen 204. In this example, opposing lateral sides of the soft cover 208 can be held in place by the frame 206 while ends of the leading edge of the soft cover 208 can be pinned by the frame 206 such that the leading edge is exposed and extends between opposing sides of the frame 206. In some embodiments the leading edge of the soft cover 208 can be substantially rigid, such that the leading edge is held against the platen 204 when its ends are pinned by the frame 206. As such, in this example, the soft cover 208 can locally block light transmission above the portion of the platen 204 that is to be scanned.

In some embodiments the image reproduction device 100 can further comprise a hard cover 218. The hard cover 218 can be a hinged lid or other cover that can be flipped down to cover the platen 204 when an object 216 is a piece of paper or other planar substrate with minimal depth, such that the hard cover 218 can block outside light and/or prevent the escape of interior light during scanning of the object 216 with the scanner components 108. However, when the object 216 is deep enough that the hard cover 218 could not be fully lowered to be parallel with the platen 204, and outside light could therefore pass through the platen 204 and reach the scanner components 108 and/or interior light emitted by scanner components 108 could escape, users can have the option of using the soft cover 208 as described above to cover deeper three dimensional objects 216 during scanning. The hard cover 218 can be above the frame 206, such that when the frame 206 is in its lowered position it avoids interference with operation of the hard cover 218.

In some embodiments the image reproduction device 100 can additionally comprise input/output devices 220 through which users can interact with the user interface 106 and direct operations of the image reproduction device 100. The input/output devices 220 can be screens, buttons, keyboards, switches, dials, indicator lights, speakers, and/or any other type of input or output device. By way of a non-limiting example, an input/output device 220 can be a liquid-crystal display (LCD) screen mounted on the exterior of the housing 202, such as at a position adjacent to the platen 204. In some embodiments, screens can be touch-sensitive. In other embodiments, users can interact with a user interface displayed on a screen using other controls such as buttons or keyboards.

FIGS. 4A-4E depicts an alternate embodiment of an image reproduction device 100 in which the soft cover 208 is mounted to the frame 206 such that the frame 206 can extend or retract the soft cover 208.

In some embodiments, portions of the soft cover 208 can be coupled with a movement system 402 on the frame 206. In some embodiments, the movement system 402 can comprise rails on the underside of the frame 206, and anchor points at the leading edge of the soft cover can be mounted on the rails such that they can be moved along the rails. In other embodiments, the movement system 402 can be grooves, tracks, or other routes that can be traversed by components of the soft cover 208. When the soft cover 208 is extended along the movement system 402 such that the soft cover 208 spans the length of the frame 206 and/or would cover any objects 216 resting on the platen 204, the frame 206 and soft cover 208 can be lowered collectively such that the soft cover 208 covers the objects on the platen within the frame's aperture.

Figure 4A:
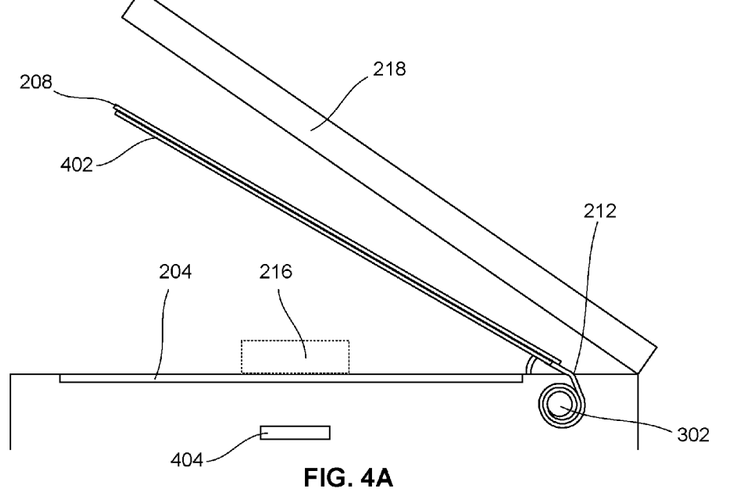
FIGS. 4A-4E depicts an alternate embodiment of an image reproduction device in which a soft cover is movably mounted to a frame.
Figure 4B:
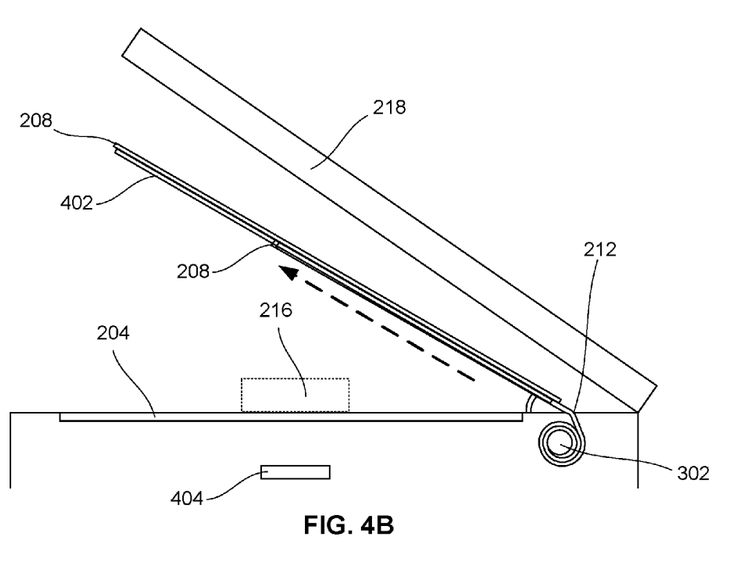
Figure 4C:
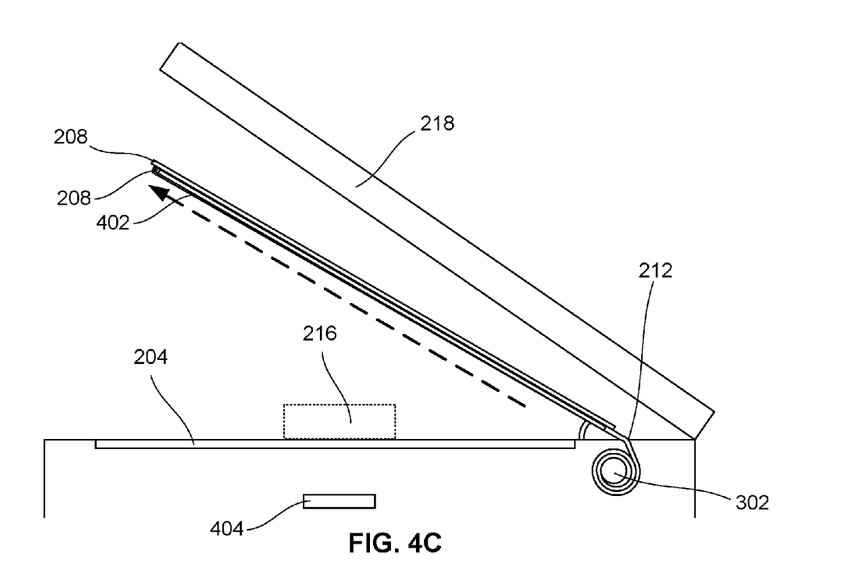
Figure 4D:
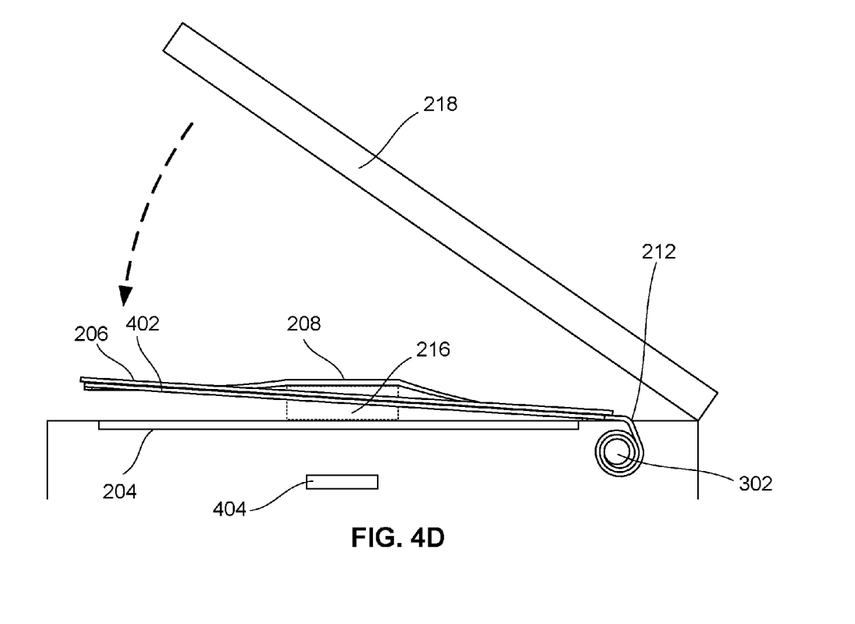
Figure 4E:
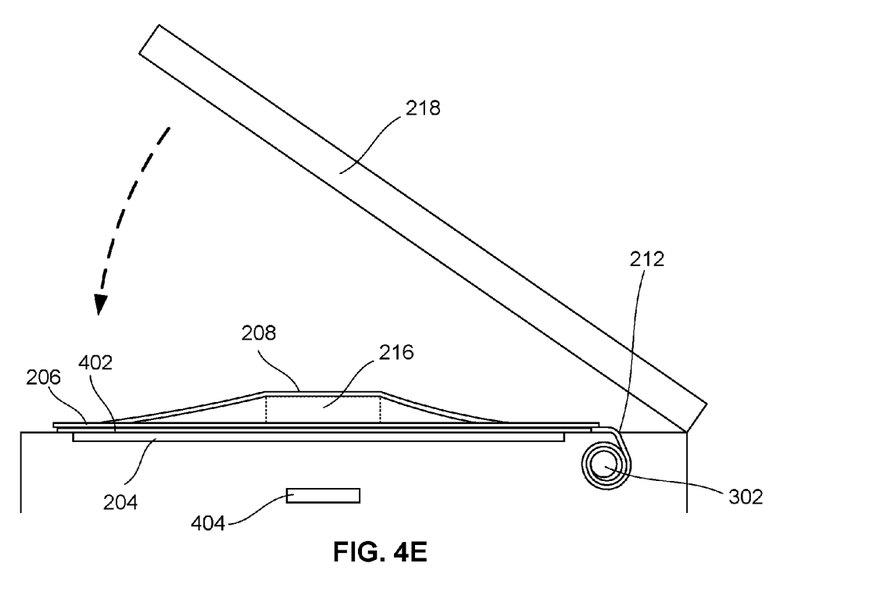

By way of non-limiting example, FIGS. 4A-4E depicts the frame 206 in which the movement system 402 is a pair of parallel rails extending along opposite sides of the frame 206. As shown in FIG. 4A, the leading edge of the soft cover 208 can be coupled with a movable connector mounted on the rails. The moveable connector can be moved along the rails as shown in FIGS. 4B and 4C to extend the soft cover out of the soft cover slot 212 and across the frame 206. When the soft cover 208 has been extended across the frame and fills the frame's aperture, the frame 206 and soft cover 208 can together be lowered toward the platen 204. As seen in FIGS. 4D and 4E, the soft cover 208 can deform to accommodate the depth of an object 216 on the platen 204.

While in some embodiments the soft cover 208 can be moved manually along the frame's movement system 402, in other embodiments the movement system 402 can be automated. In some embodiments the movement system 402 can comprise pulley system, motors, servos, and/or other mechanized components that can manually pull or push the soft cover 208 along the frame 206. In embodiments in which the movement system 402 is automated, the movement of the soft cover 208 can be activated in response to a user input received via the user interface 106 to begin scanning.

Figure 5:
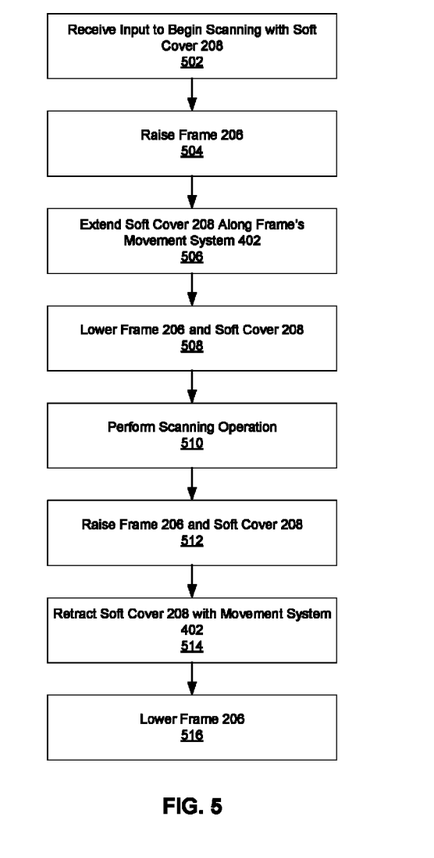
FIG. 5 depicts an exemplary process for operating a frame and soft cover automatically during a scanning operation.

By way of a non-limiting example, FIG. 5 depicts a process for operating the frame 206 and soft cover 208 automatically using automated movement of the frame 206 and soft cover 208.

At step 502, the image reproduction device 100 can receive an input via a user interface 106 to begin a scanning operation using the soft cover 208.

At step 504, the image reproduction device 100 can use servos, motors, or other mechanized components to move the frame 206 into its raised position.

At step 506, the image reproduction device 100 can use an automated movement system 408 to extend the soft cover 208 out of the soft cover slot 212 and across the raised frame.

At step 508, once the soft cover 208 has been pulled across the frame 206 and spans the frame aperture, the image reproduction device 100 can lower the frame into its lowered position. As the soft cover 208 fills the frame aperture, the soft cover 208 can deform to accommodate the depth of an object 216 on the platen 204. The soft cover 208 can be held down at its edges by the edges of the frame aperture, such that exterior light is blocked from passing through the platen 204 into scanner components 108 and interior light emitted from the scanner components 108 is prevented from escaping. In some embodiments, a soft cover storage roll 302 or other component can pull on the soft cover 208 to tension the soft cover 208 toward the soft cover slot 212 and remove any slack.

At step 510, the image reproduction device 100 can perform a scanning operation using scanner components 108. By way of a non-limiting example, the scanner components 108 can emit light toward the platen and activate image sensors to scan an object 216 on the platen 204. The soft cover 208 can block unwanted exterior light and prevent the escape of interior light, to avoid interference with the quality of the scan.

At step 512, after scanning is complete, the image reproduction device 100 can raise the frame 206 to its raised position.

At step 514, the automated movement system 402 can move the soft cover 208 back to its retracted position.

At step 516, the image reproduction device 100 can again lower the frame 206 to its lowered position.

Returning to FIGS. 4A-4E, in some embodiments in which movement of the frame 206 and/or soft cover 208 is automated, the image reproduction device 100 can comprise one or more ambient light sensors 404 inside its housing 202. The ambient light sensors 404 can continually or periodically measure the amount of ambient light passing into the housing 202 through the platen 104 as the soft cover 208 is lowered into position prior to scanning. In the event that the image reproduction device 100 is unable to fully close the frame 206 and/or fully stretch the soft cover 208 around an object 216 on the platen 204 with its automated movements, or if stretching the soft cover 208 too much begins to let light to be transmitted through it, the image reproduction device 100 can move the frame 206 and/or soft cover 208 into a position at which the ambient light sensors 404 detect the lowest level of ambient light entering the housing 202. By way of a non-limiting example, if the level of detected ambient light initially decreases as the image reproduction device 100 lowers the soft cover 208 around an object 216 but the level of detected ambient light then begins to increase again as the soft cover 208 stretches further around the object 216, the image reproduction device 100 can reverse its servos to return the soft cover 208 to the position with the minimum detected amount of ambient light. As such, in some embodiments the amount of ambient light entering the housing 202 through the platen 204 can be minimized during scanning even when the soft cover 208 is not entirely sealed against the platen 204, although in other embodiments the image reproduction device 100 can prioritize sealing the soft cover 208 against the platen 204 with the frame 206.

Figure 6A:
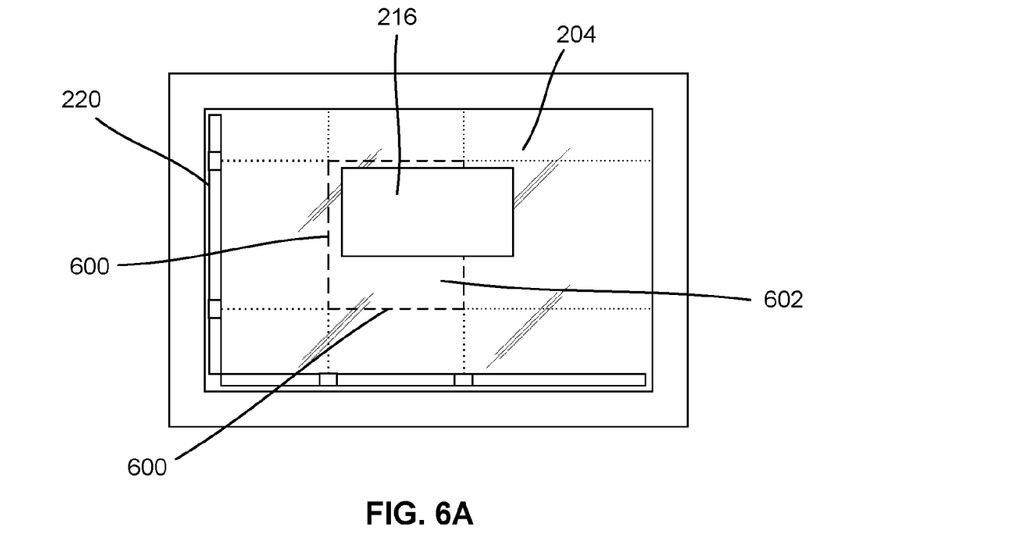
FIGS. 6A-6B depict scan boundary indicators being displayed on the platen prior to a scanning operation.
Figure 6B:
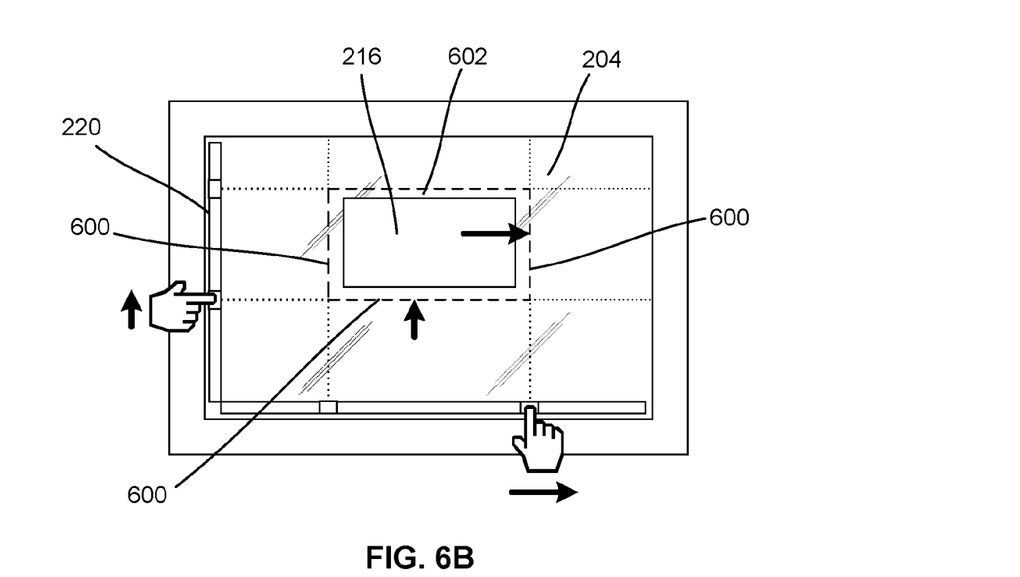

FIGS. 6A-6B depicts scan boundary indicators 600 being displayed on the platen 204 prior to scanning. In some embodiments, the image reproduction device 100 can display scan boundary indicators 600 on the platen 204 to indicate the currently selected position and/or dimensions of the area that is set to be scanned. In some embodiments, the scan boundary indicators 600 can be can be lasers projected onto the platen 204 by movable laser emitters inside the housing 202. By way of a non-limiting example, the scan boundary indicators 600 can be the scan boundary indicators described in U.S. patent application Ser. No. 14/970,432, herein incorporated by reference.

In some embodiments, two pairs of scan boundary indicators 600 positioned orthogonally can indicate the outer borders of a rectangular scan area away from the edges of the platen 204, as shown in FIGS. 6A-6B. In other embodiments two scan boundary indicators 600 positioned orthogonally can indicate movable edges of the scan area while edges of the platen 204 indicate fixed edges of the scan area.

In some embodiments the housing 202 can comprise touch sensitive strips, buttons, dials, a user interface on a screen, or other input devices 220 through which users can instruct the image reproduction device 100 to move one or more scan boundary indicators 600. Movement of the scan boundary indicators 600 can change the size and/or position of the scan area on the platen 204, and allows the user to visually see the changes as shown in FIGS. 6A-6B.

In operation, users can use scan boundary indicators 600 to visually adjust the size of the scan area around an object 216 prior to using the frame 206 and soft cover 208 to cover the object 216. The scanner components 108 can then scan the area of the platen 204 corresponding to the selected scan area. In alternate embodiments, users can select the size and position of a scan area using inputs on a screen or other input/output device 220.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. An image reproduction device, comprising:
  a platen covering image sensors;
  a frame with a central aperture, the frame being selectively movable between a lowered position in which the frame is parallel to and surrounds the platen and a raised position in which the frame is above the platen; and
  a soft cover having a leading edge coupled to a movement system on the frame, the soft cover being selectively extendable from a storage position by the movement system to an extended position in which the soft cover at least partially spans the frame's central aperture,
  wherein when the soft cover is extended by the movement system to at least partially span the frame's central aperture and the frame and soft cover are moved to the frame's lowered position, the frame seals the soft cover around an object resting on the platen and the soft cover blocks transmission of light during scanning of the object with the image sensors; and
  wherein the movement system comprises a motor configured to move the leading edge of the soft cover along one or more rails that extend along the length of the frame.

2. The image reproduction device of claim 1, wherein the soft cover comprises stretchable and/or flexible material.

3. The image reproduction device of claim 1, wherein the soft cover is mounted on a roll such that the soft cover's storage position is wrapped around the roll.

4. The image reproduction device of claim 3, wherein the roll is spring loaded to tend to retract the soft cover around the roll.

5. The image reproduction device of claim 1, wherein the frame is mounted on mechanized arms configured to automatically raise and lower the frame.

6. The image reproduction device of claim 1, further comprising one or more ambient light detectors mounted below the platen, the ambient light detectors being configured to measure the level of ambient light passing through the platen, wherein the motor moves the soft cover into a position at which the ambient light detectors detect the lowest level of ambient light.

7. The image reproduction device of claim 1, further comprising a plurality of movable laser emitters configured to project scan boundary indicators on the platen that indicate the borders of a scan area.

8. A method of scanning, comprising:
  raising a frame with motorized arms to a position above a platen upon receipt of an instruction to begin a scanning operation, the frame defining a frame aperture;
  extending a soft cover from a storage position across the length of the frame to at least partially span the frame aperture using a motorized movement system;
  lowering the frame and soft cover with the motorized arms towards a position parallel to and against the platen;

performing a scanning operation with scanner components below the platen, wherein light emitted by scanner components is blocked from escaping by the soft cover and exterior light is blocked from reaching the scanner components by the soft cover; and measuring a level of ambient light passing through the platen with one or more ambient light sensors, and moving the frame and soft cover to a position at which the ambient light sensors detect the lowest level of ambient light.

9. The method of scanning of claim 8, further comprising scanning a scan area on said platen that is covered by the soft cover and storing a digital image representation of the scan area in memory.

10. The method of scanning of claim 9, further comprising projecting scan boundary indicators onto the platen with movable laser emitters that indicate the borders of the scan area.

11. The method of scanning of claim 8, wherein the soft cover comprises stretchable and/or flexible material.

12. The method of scanning of claim 8, wherein the soft cover is mounted on a roll such that the soft cover's storage position is wrapped around the roll.

13. The method of scanning of claim 12, wherein the roll is spring loaded to tend to retract the soft cover around the roll.

14. The method of scanning of claim 8, further comprising a soft cover anchor to which a leading edge of the soft cover can be attached to hold the soft cover in place when the soft cover is extended to fully span the platen.

15. The method of scanning of claim 8, wherein the frame is mounted on mechanized arms configured to automatically raise and lower the frame.

16. The method of scanning of claim 8, further comprising:
providing a plurality of movable laser emitters configured to project scan boundary indicators on the platen configured to indicate the borders of a scan area.

17. The method of scanning of claim 8, wherein the step of performing a scanning operation is dependent upon a user input.

18. The method of scanning of claim 17, wherein the user input comprises modifying scan boundary indicators.

19. The image reproduction device of claim 1 further comprising an input/output device coupled with the image sensors.

20. The image reproduction device of claim 19 wherein the input/output device controls at least one scan boundary on the platen.

* * * * *